United States Patent
Feng et al.

(10) Patent No.: US 7,848,408 B2
(45) Date of Patent: Dec. 7, 2010

(54) METHOD AND SYSTEM FOR PARAMETER GENERATION FOR DIGITAL NOISE REDUCTION BASED ON BITSTREAM PROPERTIES

(75) Inventors: Chenhui Feng, Sunnyvale, CA (US); Brian Schoner, Fremont, CA (US); Darren Neuman, Palo Alto, CA (US)

(73) Assignee: Broadcom Corporation, Irvine, CA (US)

( * ) Notice: Subject to any disclaimer, the term of this patent is extended or adjusted under 35 U.S.C. 154(b) by 1236 days.

(21) Appl. No.: 11/083,597

(22) Filed: Mar. 18, 2005

(65) Prior Publication Data

US 2006/0171458 A1  Aug. 3, 2006

Related U.S. Application Data

(60) Provisional application No. 60/648,297, filed on Jan. 28, 2005.

(51) Int. Cl.
*H04B 1/66* (2006.01)
(52) U.S. Cl. .................................. 375/240.03
(58) Field of Classification Search ............. 375/240.03
See application file for complete search history.

(56) References Cited

U.S. PATENT DOCUMENTS 5,590,064 A * 12/1996 Astle .................. 708/203

\* cited by examiner

*Primary Examiner*—Y. Lee
*Assistant Examiner*—Richard Torrente
(74) *Attorney, Agent, or Firm*—McAndrews, Held & Malloy, Ltd.

(57) ABSTRACT

A method and system for parameter generating for digital noise reduction based on bitstream properties is provided, which may comprise receiving at a host processor, a plurality of picture level parameters generated by a video decoder for a video stream. The host processor may control a digital noise reduction (DNR) module that processes input video from a video bus using the received plurality of picture level parameters.

27 Claims, 6 Drawing Sheets

METHOD AND SYSTEM FOR PARAMETER GENERATION FOR DIGITAL NOISE REDUCTION BASED ON BITSTREAM PROPERTIES

CROSS-REFERENCE TO RELATED APPLICATIONS/INCORPORATION BY REFERENCE

This patent application makes reference to, claims priority to and claims benefit from U.S. Provisional Patent Application Ser. No. 60/648,297 filed on Jan. 28, 2005.

This application makes reference to:
U.S. patent application Ser. No. 11/087,491 filed Mar. 22, 2005;
U.S. patent application Ser. No. 11/090,642 filed Mar. 25, 2005; and
U.S. patent application Ser. No. 11/089,788 filed Mar. 25, 2005.

Each of the above referenced applications is hereby incorporated herein by reference in its entirety.

FIELD OF THE INVENTION

Certain embodiments of the invention relate to reducing noise in signals. More specifically, certain embodiments of the invention relate to a method and system for parameter generation for digital noise reduction function based on bitstream properties.

BACKGROUND OF THE INVENTION

Advances in compression techniques for audio-visual information have resulted in cost effective and widespread recording, storage, and/or transfer of movies, video, and/or music content over a wide range of media. The Moving Picture Experts Group (MPEG) family of standards is among the most commonly used digital compressed formats. One major advantage of MPEG compared to other video and audio coding formats is that MPEG-generated files tend to be much smaller for the same quality. This is because MPEG uses very sophisticated compression techniques. However, MPEG compression may be lossy and, in some instances, it may distort the video content. In this regard, the more the video is compressed, that is, the higher the compression ratio, the less the reconstructed video resembles the original information. Some examples of MPEG video distortion are the loss of texture, detail, and/or edges. MPEG may also result in ringing on sharper edges and/or discontinuities on block edges. Because MPEG compression techniques are based on defining blocks of video image samples for processing, MPEG compression may also result in visible "macroblocking" that may result due to bit errors. In MPEG, a macroblock is an area covered by a 16×16 array of luma samples in a video image. Luma may refer to a component of the video image that represents brightness. Moreover, noise due to quantization operations, as well as aliasing and/or temporal effects may all result from the use of MPEG compression operations.

When MPEG video compression results in loss of detail in the video image it is said to "blur" the video image. In this regard, operations that are utilized to reduce compression-based blur are generally called image enhancement operations. When MPEG video compression results in added distortion on the video image it is said to produce "artifacts" on the video image. For example, the term "mosquito noise" may refer to MPEG artifacts that may be caused by the quantization of high spatial frequency components in the image. Mosquito noise may also be referred to as "ringing" or "Gibb's effect."

Some of the characteristics of mosquito noise may result from the fact that it is an artifact of the 8×8 block Discrete Cosine Transform (DCT) operation in MPEG compression. While generally confined to a particular 8×8 block of video samples, in some instances, motion compensation may result in mosquito noise beyond the block boundary. Mosquito noise commonly appears near luma edges, making credits, text, and/or cartoons particularly susceptible to this form of artifact. Mosquito noise may be more common, and generally more severe, at low bit rates. For example, mosquito noise may be more severe when macroblocks are coded with a higher quantization scale and/or on a larger quantization matrix.

Mosquito noise may tend to appear as very high spatial frequencies within the processing block. In some instances, when the input video to the MPEG compression operation has any motion, the mosquito noise generated may tend to vary rapidly and/or randomly resulting in flickering noise. Flickering noise may be particularly objectionable to a viewer of the decompressed video image. In other instances, when the input video to the MPEG compression operation is constant, the mosquito noise that results is generally constant as well. Horizontal edges tend to generate horizontal ringing while vertical edges tend to generate vertical ringing. While mosquito noise may also occur in the color components or chroma of a video image, it may generally be less of a problem since it is less objectionable to a viewer of the decompressed video image.

There have been attempts to provide normative approaches for reducing the effects of mosquito noise. For example, the MPEG4 specification ISO/IEC 14496-2:1999/Amd.1:2000 (E) Annex F comprises a state-of-the-art mosquito noise filter, which is also called a deringing filter, which may be utilized to filter out mosquito noise. However, the MPEG4-based deringing filter may have several limitations. For example, the MPEG4 deringing filter may have a hard threshold based on the binary index operation bin(h,v). Accordingly, small changes in pixel values may cause the filter to turn ON or OFF, causing objectionable pixel flickering. The MPEG4 deringing filter may only be applied to 8×8 blocks. This may limit the utility of the deringing filter since under high-motion and/or low bit rate conditions motion compensation may move mosquito noise beyond the transform block edges. The deringing filter kernel is symmetrical vertically and horizontally and as a result, the deringing filter may not correct for interlaced video, where the vertical pixel or sample distance is twice the horizontal pixel distance. Another limitation arises because the detection algorithm utilized by the MPEG4 deringing filter may often overfilter or underfilter video images. Moreover, the detection algorithm may utilize a 10×10 block of pixels or samples to detect mosquito noise and this large block size may be very expensive for raster-scan implementations.

The MPEG4 specification ISO/IEC 14496-2 Annex F also comprises a state-of-the-art block noise filter, which is also called a deblocking filter. However, the MPEG4-based deblocking filter may have several limitations. The associated block noise detection algorithm is based on a few neighboring pixels and as a result, this algorithm may frequently filter real content erroneously. Horizontal edges are filtered similar to vertical edges and as a result, this method may be inappropriate for interlaced video, and results in artifacts from the filtering. Furthermore, horizontal edge filtering requires 10 vertically adjacent pixels, which, for raster-scanned video, requires 9 lines stores. As a result, implementation may be very expensive. Future solutions to the presence of these types of video compression artifacts may need to provide cost effective and easy to implement reductions in mosquito noise and block noise without any perceptible degradation in video quality.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for parameter generation for digital noise reduction based on bitstream properties, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

A method and system for parameter generation for digital noise reduction based on bitstream properties is provided which may comprise receiving at a host processor, a plurality of picture level parameters generated by a video decoder for a video stream. The host processor may control a digital noise reduction (DNR) module that processes input video from a video bus using the received plurality of picture level parameters.

Figure 1:
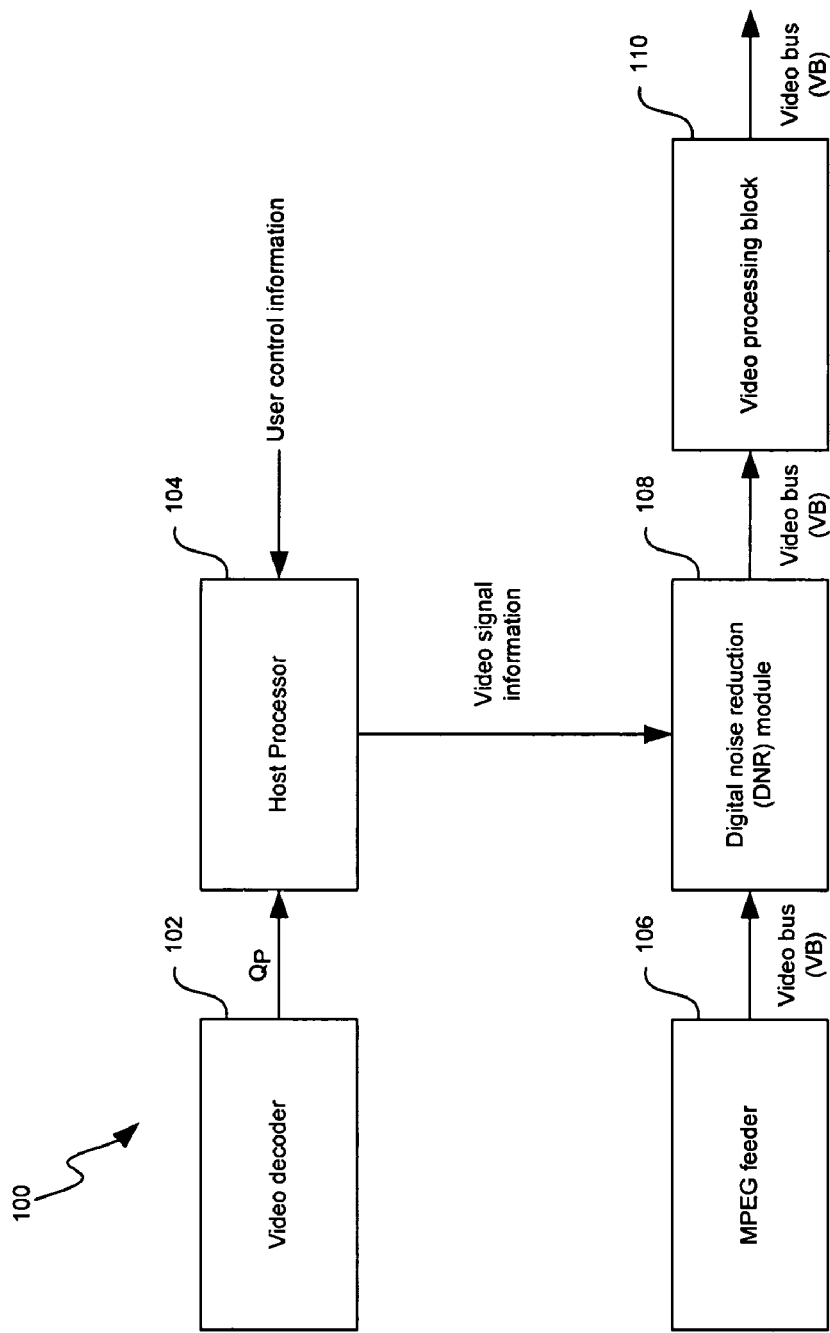
FIG. 1 is a block diagram of an exemplary video processing system that may be utilized for digital noise reduction (DNR), in accordance with an embodiment of the invention.

FIG. 1 is a block diagram of an exemplary video processing system that may be utilized for digital noise reduction (DNR), in accordance with an embodiment of the invention. Referring to FIG. 1, there is shown a video processing system 100 comprising a video decoder 102, a host processor 104, an MPEG feeder 106, a digital noise reduction (DNR) module 108 and a video processing block 110. The video decoder 102 may comprise suitable logic, circuitry, and/or code that may be adapted to decode compressed video information. The host processor 104 may comprise suitable logic, circuitry, and/or code that may be adapted to process quantization information, Qp, received from the video decoder 102 and/or user control information received from at least one additional device or processing block. The host processor 104 may be adapted to generate video signal information that corresponds to a current picture based on the processed quantization information and/or user control information. The generated video signal information may comprise, for example, threshold settings, indications of whether a video field is a top field or a bottom field, indications of whether the video signal is interlaced or progressive, and/or the size of the video image. The host processor 104 may transfer the video signal information to the DNR module 108. In some instances, at least a portion of the video signal information may be received by the DNR module 108 via a register direct memory access (DMA).

The MPEG feeder 106 may comprise suitable logic, circuitry, and/or code that may be adapted to transfer a plurality of MPEG-coded images to the DNR module 108 via a video bus (VB), for example. In this regard, the VB may utilize a specified format for transferring images from one processing or storage block to another processing or storage block. The DNR module 108 may comprise suitable logic, circuitry, and/or code that may be adapted to reduce some artifacts that may result from MPEG coding. In this regard, the DNR module 108 may be adapted to process MPEG-coded images to reduce mosquito noise and block noise.

U.S. application Ser. No. 11/090,642 entitled "Method and system for block noise reduction," discloses a method and system for block noise reduction and is hereby incorporated herein by reference in its entirety. U.S. application Ser. No. 11/087,491 entitled "Method and system for mosquito noise reduction," discloses a method and system for block noise reduction and is hereby incorporated herein by reference in its entirety.

The processing performed by the DNR module 108 may be based on the contents of a current video image and on the video signal information corresponding to that current video image transferred from the host processor 104. The video signal information may be programmed or stored into registers in the DNR module 108 during the vertical blanking interval, for example. This programming approach may reduce any unpredictable behavior in the DNR module 108. The DNR module 108 may be adapted to transfer the processed MPEG-coded images to the video processing block 110 via the VB. The video processing block 110 may comprise suitable logic, circuitry, and/or code that may be adapted to perform various image processing operations such as scaling and/or deinterlacing, for example, on the processed MPEG-coded images received from the DNR module 108.

When the pictures from the MPEG feeder 106 are coded as field pictures they may be transferred to the DNR module 108 as field pictures. When the pictures from the MPEG feeder 106 are coded as frame pictures they may be transferred to the DNR module 108 as frame or field pictures in accordance with the video stream format and/or the display. In this regard, frame pictures that are transferred to the DNR module 108 as field pictures may have mosquito noise on 4 vertical line boundaries.

The DNR module 108 may also be adapted to provide post-processing operations for the Advanced Video Codec (AVC) and/or the SMPTE VC-1 codec. The deblocking or artifact reduction operations performed by the DNR module 108 may be relaxed for AVC and VC-1 because they specify in-loop deblocking filters. For example, AVC transforms may exhibit less ringing than the 8×8 DCT utilized in MPEG. Moreover, while AVC and VC-1 allow image block sizes smaller than 8×8 to be utilized, processing at the sub-block level may present some difficulties and the DNR module 108 may perform deblocking filtering for AVC and VC-1 without sub-block processing.

A quantization process may cause the compression artifacts, and the DNR module 108 may be able to adapt to the quantization parameters. In MPEG-2, the quantization parameters in the bitstreams may include quantization weighting matrices. In AVC, $QP_Y$ is the quantization parameter for luma and $QP_C$ is the quantization parameter for chroma. The AVC main profile may not be adapted to support a downloadable quantization matrix. In the society of motion picture and television engineers (SMPTE) VC-1, quantization weighting matrices may not be used and the quantization parameter may be macroblock layer quantization information (MQUANT).

The quantization parameters may vary within a picture. The DNR module 108 may be adapted to process each macroblock according to its quantization parameter, which may be different for every single macroblock. The experiments with encoders and real world bitstreams may indicate that the variance of quantization parameters within a picture is small. The encoders may limit the variation of the quantization parameters from macroblock to macroblock so the amount of the quantization noise may be relatively evenly distributed over the whole picture. In accordance with an embodiment of the invention, the DNR module 108 may be designed to be a post-processing unit outside the MPEG decoder core. Various embodiments of the invention provide for the generation of picture level average quantization parameters (Qp) in the video decoder 102 and passing quantization parameters (Qp) from a video decoder 102 to the host processor 104. The host processor 104 may program the DNR module 108 based on Qp information.

Figure 2:
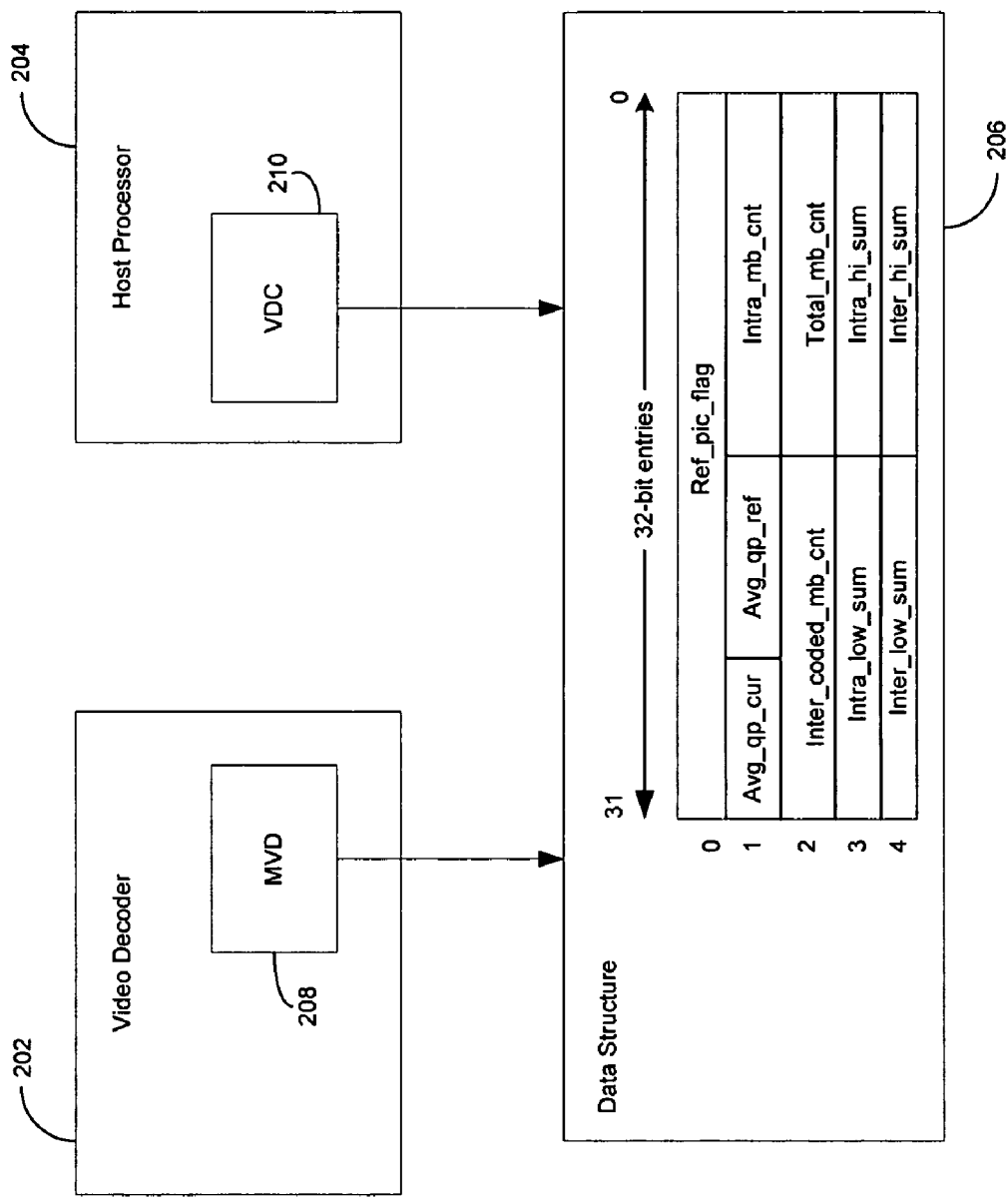
FIG. 2 is a block diagram illustrating transfer of DNR related picture level parameters from the video decoder to the host processor, in accordance with an embodiment of the invention.

FIG. 2 is a block diagram illustrating transfer of picture level parameters relating to the DNR module 108 of FIG. 1 from the video decoder 102 of FIG. 1, for example, to the host processor 104 of FIG. 1, for example. Referring to FIG. 2, there is shown a video decoder 202, a host processor 204 and a data structure 206. The video decoder 202 may comprise a MPEG video decoder (MVD) block 208. The host processor 204 may comprise a video display control block (VDC) 210.

The video decoder 202 may comprise suitable logic, circuitry, and/or code that may be adapted to decode compressed video information. The host processor 204 may comprise suitable logic, circuitry, and/or code that may be adapted to process quantization information, Qp, received from the video decoder 202 and/or user control information received from at least one additional device or processing block. The host processor 204 may be adapted to generate video signal information that corresponds to a current picture based on the processed quantization information and/or user control information. The MPEG video decoder (MVD) block 208 may comprise suitable logic, circuitry and/or code that may be adapted to transmit the data structure 206 to the VDC 210 when a picture is decoded.

It may be assumed that the VDC 210 already knows if a picture is entering the video network (VN) such as a Broadcom video network (BVN) as a top field, bottom field, or frame, and may not need additional parameters from the MVD block 208 to determine them. For an exemplary structure, picture_structure, the DNR module 108 may be adapted to determine how the parameters may enter the BVN. For example, if a top field picture enters the BVN, and is deinterlaced by a motion adaptive deinterlacer (MAD) to become a progressive frame, the DNR picture_structure may be top field. As another example, if a 480p progressive frame enters the BVN, and is vertically scaled to become a 480i bottom field, the DNR picture_structure may be a frame.

The video decoder 202 may perform the bitstream parameter generation function. Based on the decoded bitstream parameters, the video decoder 202 may be adapted to generate and pass to the host processor 204 the following picture level parameters. A parameter, ref_pic_flag, may represent a one bit flag indicating that the current picture is a reference picture when set. A parameter, avg_qp_cur, may be an 8-bit unsigned integer indicating the average quantization parameter (Qp) of current picture. A parameter, avg_qp_ref, may be an 8-bit unsigned integer indicating the average quantization parameter (Qp) of the reference picture of current picture. A parameter, intra_mb_cnt, may be a 16-bit unsigned integer indicating the total number of intra macroblocks in the current picture. A parameter, inter coded_mb_cnt, may be a 16-bit unsigned integer indicating the total number of inter macroblocks with non-zero coded block pattern in the current picture. A parameter, total_mb_cnt, may be a 16-bit unsigned integer indicating the total number of macroblocks, including skipped macroblocks, in the current picture. A parameter, intra_low_sum, may be a 16-bit unsigned integer indicating the sum of the low order, for example, first 36 matrix elements, in zig-zag scan order, of the intra quantization matrix. A parameter, intra_hi_sum, may be a 16-bit unsigned integer indicating the sum of the high order, for example, last 28 matrix elements, in zig-zag scan order, of the intra quantization matrix. A parameter, inter_low_sum, may be a 16-bit unsigned integer indicating the sum of the low order, for example, first 36 matrix elements, in zig-zag scan order, of the inter quantization matrix. A parameter, inter_hi_sum, may be a 16-bit unsigned integer indicating the sum of the high order, for example, last 28 matrix elements, in zig-zag scan order, of the inter quantization matrix.

In MPEG, there are three types of coded pictures. Intra (I) pictures are fields or frames that may be coded as a stand-alone image. The I coded pictures may allow random access points within the video stream and may be used where scene cuts occur. The predicted (P) pictures are fields or frames coded relative to the nearest previous I or P picture, resulting in forward prediction processing. The P pictures may provide more compression than I pictures through the use of motion compensation. Bidirectional (B) pictures are fields or frames that may use the closest path and future I or P picture as a reference, resulting in bidirectional prediction. The B pictures may provide the most compression relative to I and/or P pictures and may decrease noise by averaging two pictures. A group of pictures (GOP) is a series of one or more coded pictures intended to assist in random accessing and editing. The GOP value may be configurable during the encoding process and a lower GOP value may indicate a better response to movement and a lower compression.

The generation of the bitstream picture level parameters when decoding video bitstreams in MPEG2 video coding standard may be defined as follows. A reference picture flag, ref_pic_flag, may be set when the current picture type is I or P and reset when the current picture is a B picture. The number of total macroblocks, total_mb_cnt, may count all the macroblocks in the picture, including skipped macroblocks. The quantization parameter Qp may have a range of 1 to 112, inclusive, for example. For each picture, the average Qp of the current picture, avg_qp_cur, may be calculated as:

$$avg\_qp\_cur = \text{sum of } Qp \text{ of each macroblock}/total\_mb\_cnt$$

The Qp for skipped macroblocks may be set to the Qp value of the previous non-skipped macroblock. In case of field pictures, the average Qp of the current picture, avg_qp_cur, may be averaged over the whole frame, both the top field picture and the bottom field picture, to simplify the calculation. Both field pictures may have the same average Qp of the current picture, avg_qp_cur, value.

The average Qp of the reference picture, avg_qp_ref, for an I picture may be set to be the same as the average Qp of the current picture, avg_qp_cur, of the picture. For P picture, the average Qp of the reference picture, avg_qp_ref, may take the value of average Qp of the current picture, avg_qp_cur, of the most recent reference picture, for example, I or P picture. The average Qp of the reference picture, avg_qp_ref, for a B picture may be the arithmetic average of the average Qp of the current picture, avg_qp_cur, values of the two most recently decoded reference pictures. The average Qp of the reference picture, avg_qp_ref, for a B picture may also be a weighted average of the Qp of the reference I and reference P pictures depending on the motion vector direction, for example, forward, backward or bidirectional, but an arithmetic average may be a reasonable approximation as the Qp for I and P pictures are fairly close in most cases. In the case of the first consecutive B pictures immediately following the first coded I frame in a closed GOP, the average Qp of the reference picture, avg_qp_ref, for the B pictures may be set to the average Qp of the current picture, avg_qp_cur, of the first decoded I frame as there may not be a P picture available yet for reference in the current GOP.

The macroblock_intra may be a flag that may affect the bitstream syntax. The macroblock type may be a variable length coded indicator that indicates the method of coding and the content of the macroblock. The total number of intra macroblocks, intra_mb_cnt, in the current picture may refer to the macroblocks with the macroblock_intra bit set in the bitstream parameter macroblock_type. The total number of inter macroblocks with non-zero coded block pattern in the current picture, inter_coded_mb_cnt, may refer to the macroblocks with the macroblock_pattern bit, a parameter derived from the macroblock_type, set in the bitstream parameter macroblock_type in MPEG2.

The sum of low order matrix elements in the quantization matrix for intra blocks, intra_low_sum, may be calculated by adding all the matrix elements w[v][u] where u+v<8. In the case of downloaded quantization matrix, as the matrix elements may be encoded in the bitstream in the zig-zag scan order, sum of low order matrix elements in the quantization matrix for intra blocks, intra_low_sum, may be the sum of the low order, for example, first 36 matrix elements decoded. The sum of low order matrix elements in the quantization matrix for intra blocks, intra_low_sum, of the default intra quantization matrix in MPEG2 is 898.

The sum of high order matrix elements in the quantization matrix for intra blocks, intra_hi_sum, may be calculated by adding all the matrix elements w[v][u] where u+v>=8. In the case of downloaded quantization matrix, as the matrix elements may be encoded in the bitstream in the zig-zag scan order, the sum of high order matrix elements in the quantization matrix for intra blocks, intra_hi_sum, may be the sum of the high order, for example, last 28 matrix elements decoded. The sum of high order matrix elements in the quantization matrix for intra blocks, intra_hi_sum, of the default intra quantization matrix in MPEG2 is 1216.

The sum of low order matrix elements in the quantization matrix for inter blocks, inter_low_sum, may be calculated by adding all the matrix elements w[v][u] where u+v<8. In the case of downloaded quantization matrix, as the matrix elements may be encoded in the bitstream in the zig-zag scan order, the sum of low order matrix elements in the quantization matrix for inter blocks, inter_low_sum, may be the sum of the low order, for example, first 36 matrix elements decoded. The sum of low order matrix elements in the quantization matrix for inter blocks, inter_low_sum, of the default intra quantization matrix in MPEG2 is 576.

The sum of high order matrix elements in the quantization matrix for inter blocks, inter_hi_sum, may be calculated by adding all the matrix elements w[v][u] where u+v>=8. In the case of downloaded quantization matrix, as the matrix elements may be encoded in the bitstream in the zig-zag scan order, the sum of high order matrix elements in the quantization matrix for inter blocks, inter_hi_sum, may be the sum of the high order, for example, last 28 matrix elements decoded. The sum of high order matrix elements in the quantization matrix for inter blocks, inter_hi_sum, of the default intra quantization matrix in MPEG2 is 448.

The generation of the bitstream picture level parameters when decoding video bitstreams in AVC video coding standard may be defined as follows. A reference picture flag, ref_pic_flag, may be set for all reference pictures and reset for non-reference pictures. The number of total macroblocks, total_mb_cnt, may count the total number of macroblocks in the current picture, including skipped macroblocks and direct mode coded macroblocks. The quantization parameter (Qp) may be derived based on the $QP_Y$ parameter decoded from the bitstream for each macroblock. The Qp value may be looked up from Table 1 using $QP_Y$ as an index:

TABLE 1

| $QP_Y$ | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| Qp | 1 | 1 | 1 | 1 | 1 | 1 | 1 | 1 | 1 | 1 | 1 | 1 | 1 | 2 | 2 | 2 | 2 | 2 |
| $QP_Y$ | 18 | 19 | 20 | 21 | 22 | 23 | 24 | 25 | 26 | 27 | 28 | 29 | 30 | 31 | 32 | 33 | 34 | 35 |
| Qp | 3 | 3 | 3 | 4 | 4 | 5 | 5 | 6 | 6 | 7 | 8 | 9 | 10 | 11 | 13 | 14 | 16 | 18 |
| $QP_Y$ | 35 | 36 | 37 | 38 | 39 | 40 | 41 | 42 | 43 | 44 | 45 | 46 | 47 | 48 | 49 | 50 | 51 | |
| Qp | 18 | 20 | 22 | 25 | 28 | 31 | 36 | 40 | 44 | 50 | 56 | 62 | 71 | 79 | 87 | 99 | 112 | |

Table 1 may be programmable by the host processor 204 to allow use of different mapping functions in the future. In an embodiment of the invention, this mapping table may only need to be set up by the host processor 204 during the initialization of the video decoder 202 before the decoding starts. The mapping table may not change during the decoding process. The average Qp of the current picture, avg_qp_cur, of a picture may be calculated as:

$$avg\_qp\_cur = \text{sum of } Qp \text{ of each macroblock} / total\_mb\_cnt$$

In case of field pictures, the average Qp of the current picture, avg_qp_cur, may be averaged over the whole frame, both the top field picture and the bottom field picture, to simplify the calculation. Both field pictures may have the same average Qp of the current picture, avg_qp_cur, value.

For IDR pictures, the average Qp of the reference picture, avg_qp_ref, may be set to be equal to average Qp of the current picture, avg_qp_cur. For pictures with no B slice, the average Qp of the reference picture, avg_qp_ref, may be set to be the average Qp of the first picture or lowest index in the reference picture list 0. For pictures with B slices, the average Qp of the reference picture, avg_qp_ref, may be set to be the arithmetic average of the average Qp of the current picture, avg_qp_cur, value of the first picture in the reference picture list 0 and the average Qp of the current picture, avg_qp_cur, value of the first picture in the reference picture list 1.

The total number of intra macroblocks, intra_mb_cnt, counts the macroblocks coded in Intra__16×16 or Intra__4×4 types. The total number of inter macroblocks, inter_coded_mb_cnt, counts all the non-intra macroblocks with non-zero coded block pattern.

As there is no quantization matrix, the quantization weighting parameter intra_low_sum is set to its default value 898. Additionally, the quantization weighting parameter intra_hi_sum is set to its default value 1216, the quantization weighting parameter inter_low_sum is set to its default value 576 and the quantization weighting parameter inter_hi_sum is set to its default value 448.

The generation of the bitstream picture level parameters when decoding video bitstreams in VC-1 video coding standard may be defined as follows. A reference picture flag, ref_pic_flag, may be set when the current picture type is I or P and reset when the current picture is a B picture. The number of total macroblocks, total_mb_cnt, counts all the macroblocks in the picture, including skipped macroblocks. The quantization parameter (Qp) may be set to be equal to 2*MQUANT, where MQUANT may be decoded for each macroblock from the bitstream. The MQUANT may have a range of 1 to 31 inclusive. The range of Qp may be 2 to 62. The average Qp of the current picture, avg_qp_cur, may be calculated as:

$$avg\_qp\_cur = \text{sum of } Qp \text{ of each macroblock}/\text{total\_mb\_cnt}$$

In case of field pictures, the average Qp of the current picture, avg_qp_cur, may be averaged over the whole frame, both the top field picture and the bottom field picture, to simplify the calculation. Both field pictures may have the same average Qp of the current picture, avg_qp_cur, value. The average Qp of reference picture, avg_qp_ref, for an I picture may be set to be the same as the average Qp of the current picture, avg_qp_cur. For P picture, the average Qp of reference picture, avg_qp_ref, may take the value of the average Qp of the current picture, avg_qp_cur, of the most recent reference picture, which may be an I or a P picture. The average Qp of reference picture, avg_qp_ref, for a B picture may be the arithmetic average of the average Qp of the current picture, avg_qp_cur, values of the two most recently decoded reference pictures.

For I pictures, the total number of intra macroblocks, intra_mb_cnt, equals the total_mb_cnt. For P and B pictures, the total number of intra macroblocks, intra_mb_cnt, is the total number of intra macroblocks with an intra flag set to 1 during decoding of the motion vectors for each macroblock.

The total number of inter macroblocks, inter_coded_mb_cnt, may be equal to the total number of inter macroblocks with non-zero coded block pattern in the current picture. As there is no quantization matrix, the quantization weighting parameter intra_low_sum is set to its default value 898. Additionally, the quantization weighting parameter intra_hi_sum is set to its default value 1216, the quantization weighting parameter inter_low_sum is set to its default value 576 and the quantization weighting parameter inter_hi_sum is set to its default value 448.

Upon receiving the bitstream picture level parameters from the video decoder 202, the host processor 204 is responsible for programming the DNR module 108 (FIG. 1) accordingly. During initialization, the picture level parameters may be set as follows:
 B_adj_only=0;
 P_adj_forwarding=1;
 alpha=0.5;

At the beginning of each video sequence or closed group of pictures (GOP) boundary, the variables may be initialized as follows:
 adj_Qp_pre=0;
 adj_Qp_ref=0;

For each picture to be processed afterward an adjusted Qp value, adj_Qp may be calculated by the host processor 204 as shown in the following pseudo code:

```
if ( P_adj_forwarding == 1 && adj_Qp_ref != 0 )
{act_qp_ref = adj_Qp_ref; }
else {act_qp_ref = avg_qp_ref; }
if (ref_pic_flag == 1)
{
    if ( B_adj_only == 1) {adj_Qp = avg_qp_cur; }
    else
    {
        w1 = (intra_mb_cnt/total_mb_cnt)
        s1 = (intra_low_sum + intra_hi_sum)/2114;
        w2 = (inter_coded_mb_cnt/total_mb_cnt)
        s2 = (inter_low_sum + inter_hi_sum)/1024;
        adj_Qp = w1 * s1 * avg_qp_cur + w2 * s2 * avg_qp_cur
            + (1−w1*s1 − w2*s2) * act_qp_ref;
    }
    adj_Qp_ref = adj_Qp;
}
else
{
    w1 = (intra_mb_cnt/total_mb_cnt)
    s1 = (intra_low_sum + intra_hi_sum)/2114;
    w2 = (inter_coded_mb_cnt/total_mb_cnt)
    s2 = (inter_low_sum + inter_hi_sum)/1024;
    adj_Qp = w1 * s1 * avg_qp_cur + w2 * s2 * avg_qp_cur
        + (1−w1*s1 − w2*s2) * act_qp_ref;
}
adj_Qp = alpha * adj_Qp + (1-alpha) * adj_Qp_pre;
adj_Qp_pre = adj_Qp;
```

The settings of the picture level parameters B_adj_only, P_adj_forwarding, and, alpha may be altered to offer better DNR performance. The picture level parameters B_adj_only and P_adj_forwarding have binary settings, 0 or 1 while alpha may be a floating number in the range of 0 to 1 inclusive. The adjusted Qp of the previous picture, adj_Qp_pre may be initialized to 0. The adjusted Qp of the reference picture, adj_Qp_ref, may be initialized to 0. The parameter, act_qp_ref, may represent the actual Qp of the reference picture. The parameter B_adj_only may be set when the Qp adjustment or calculation of the adjusted quantization parameter, adj_Qp, is only performed for B pictures while the average quantization parameter of the current picture, avg_qp_cur, may be used directly for I and/or P pictures.

The parameter P_adj_forwarding may control whether the adjusted quantization parameter, adj_Qp, or average quantization parameter of the reference picture, avg_qp_ref, is used to derive the adjusted Qp value for the following reference pictures. When the parameter P_adj_forwarding is set, the adjustment of Qp of a P picture may be carried forward and used as Qp of reference picture in the following pictures. The parameter alpha is the coefficient of the two-tap IIR filter that operates on the adjusted quantization parameter, adj_Qp. The two-tap IIR filter may provide a mechanism to smooth out large fluctuations of the adjusted quantization parameter, adj_Qp, from picture to picture. It may be possible that the large fluctuation of adjusted quantization parameter, adj_Qp, might cause the DNR module to introduce artifacts. The DNR registers may be programmed based on the adjusted quantization parameter, adj_Qp, value, user setting, and picture display parameters.

If the reference picture flag, ref_pic_flag, is set and the B_adj_only has a value of 1, the adjusted quantization parameter, adj_Qp, may be equal to the average quantization parameter of the current picture, avg_qp_cur. If B_adj_only has a value other than 1, then the adjusted average quantization parameter (adj_Qp) for a picture may be calculated as:

$$\text{adj\_Qp} = w1*s1*(\text{avg\_qp\_cur}) + w2*s2*\text{avg\_qp\_cur} + (1 - w1*s1 - w2*s2)*(\text{avg\_qp\_ref})$$

where avg_qp_ref is the average quantization parameter of the reference picture, and avg_qp_cur is the average quantization parameter of the current picture. In addition, $$w1 = (\text{intra\_mb\_cnt}/\text{total\_mb\_cnt}), w2 = (\text{inter\_coded\_mb\_cnt}/\text{total\_mb\_cnt})$$

$$s1 = (\text{intra\_low\_sum} + \text{intra\_hi\_sum})/2114$$

$$s2 = (\text{inter\_low\_sum} + \text{inter\_hi\_sum})/1024$$

where intra_mb_cnt is the total number of macroblocks, inter_coded_mb_cnt is the total number of inter macroblocks, total_mb_cnt is the total number of macroblocks, inter_low_sum is the sum of the low order, for example, first 36 matrix elements, in zig-zag scan order, of the intra quantization matrix, intra_hi_sum is the sum of the high order, for example, last 28 matrix elements, in zig-zag scan order, of the intra quantization matrix, inter_low_sum is the sum of the low order, for example, first 36 matrix elements, in zig-zag scan order, of the inter quantization matrix and inter_hi_sum is the sum of the high order, for example, last 28 matrix elements, in zig-zag scan order, of the inter quantization matrix.

Figure 3:
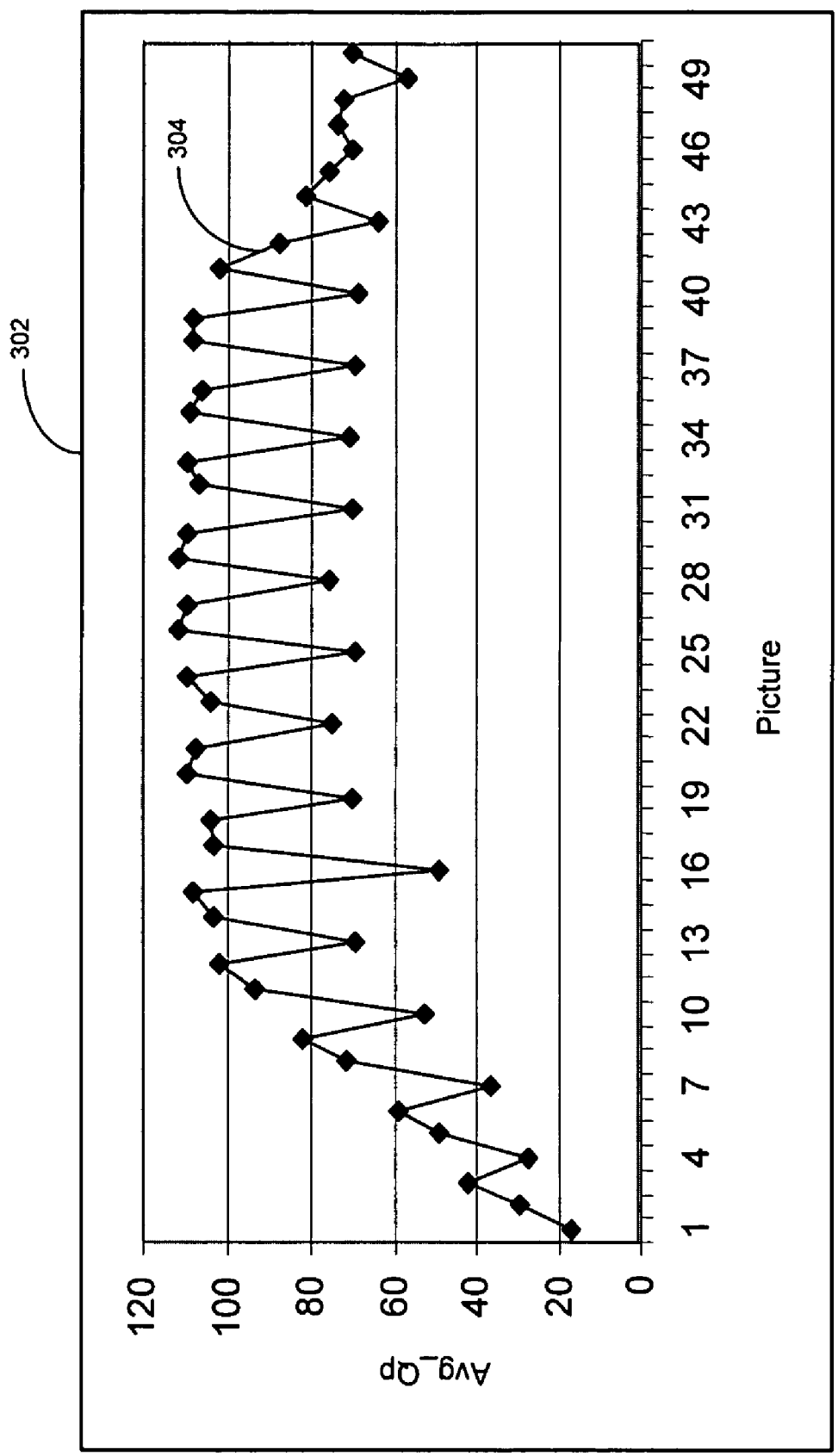
FIG. 3 is a graph illustrating a variable envelope waveform of the average Qp for each picture of a MPEG2 sequence that may be utilized in connection with an embodiment of the invention.

FIG. 3 is a graph 302 illustrating a variable envelope waveform 304 of the average Qp for each picture of a MPEG2 sequence, in accordance with an embodiment of the invention. For each picture, the average Qp may be calculated as:

$$\text{average } Qp = \text{sum of } Qp \text{ of each macroblock/total number of macroblocks}$$

The Qp for skipped macroblocks may be set to be the same as the Qp of previous non-skipped macroblock. In this particular MPEG2 video sequence, there may be two B pictures between I and/or P reference pictures. The oscillation of the average Qp may indicate that the average Qp values for B pictures may be quite different from the average Qp values of I and/or P pictures. A larger Qp may indicate lower video quality, but the larger Qp values for B pictures may not necessarily mean the B pictures exhibit more coding artifacts.

Figure 4:
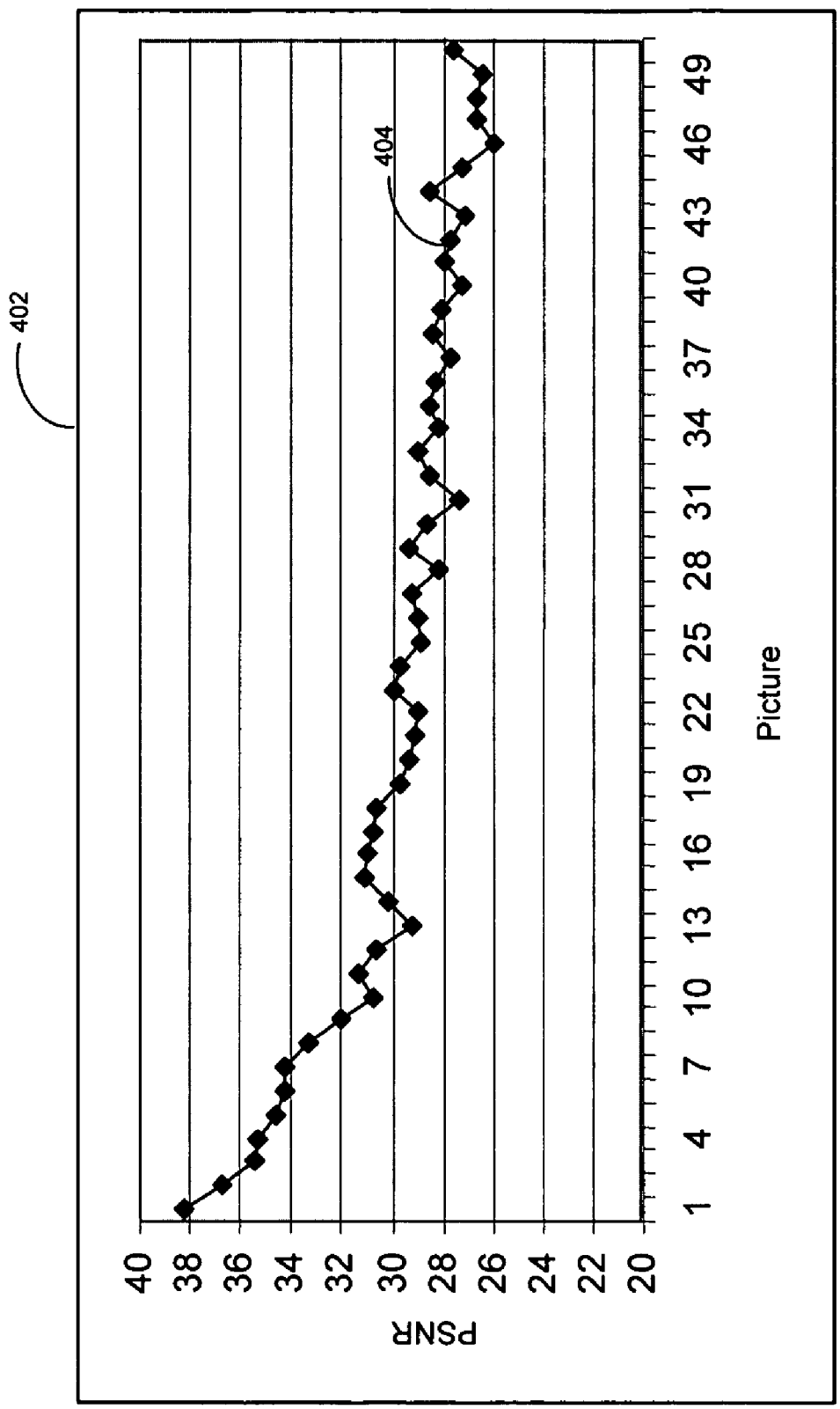
FIG. 4 is a graph illustrating a variable envelope waveform of the peak signal to noise ratio (PSNR) for each picture of a MPEG2 sequence that may be utilized in connection with an embodiment of the invention.

FIG. 4 is a graph 402 illustrating a variable envelope waveform 404 of the peak signal to noise ratio (PSNR) for each picture of a MPEG2 sequence that may be utilized in connection with an embodiment of the invention. FIG. 4 indicates that the PSNR values may not depict the same oscillation pattern as the average Qp. The PSNR values of some B pictures may be actually larger than the PSNR values of I and/or P pictures. The average Qp value as calculated above may not be used as an indicator of the digital noise level in the B pictures.

The visual quality of a B picture may be a function of the adjusted average Qp.

$$\text{adjusted } Qp = w*(\text{average } Qp \text{ of } B \text{ picture}) + (1-w)*(Qp \text{ of reference pictures})$$

The weighting parameter w may be proportional to the number of coded macroblocks in the B picture, $$w = (\text{number of coded macroblocks})/(\text{number of total macroblocks})$$

The coded macroblocks may include all the macroblocks with non-zero coefficients. The number of total macroblocks may count all the macroblocks in the picture, including skipped macroblocks.

In MPEG2, the coded macroblocks may be the macroblocks with either macroblock_pattern or macroblock_intra bit set in the bitstream parameter macroblock_type. The macroblocks with macroblock_intra bit set may be referred to as intra macroblocks while the macroblocks with macroblock_pattern bit set may be referred to as inter coded macroblocks. The Qp of reference pictures may also be a weighted average of Qp of the reference I and P pictures depending on the motion vector direction, for example, forward, backward or bi-directional, but an arithmetic average may be a reasonable approximation as the Qp for I and P pictures may be fairly close in most cases.

In the case of the first consecutive B-pictures immediately following the first coded I-frame a closed GOP, the Qp of reference pictures for these B-pictures may be set to be equal to the average Qp of the first decoded I-frame as there may be no P picture available yet for reference in the current GOP. The calculation of the adjusted Qp may be applied to I pictures and P pictures as well. In I picture case, the weighting parameter w may be 1 as all the macroblocks in I pictures are intra-coded. The adjusted Qp for an I picture may have the same value as the average Qp. The Qp of reference picture for an I picture may be set to be the same as the average Qp of the picture. In P picture case, the Qp of reference pictures may be the average Qp of the most recent reference I picture or P picture.

Figure 5:
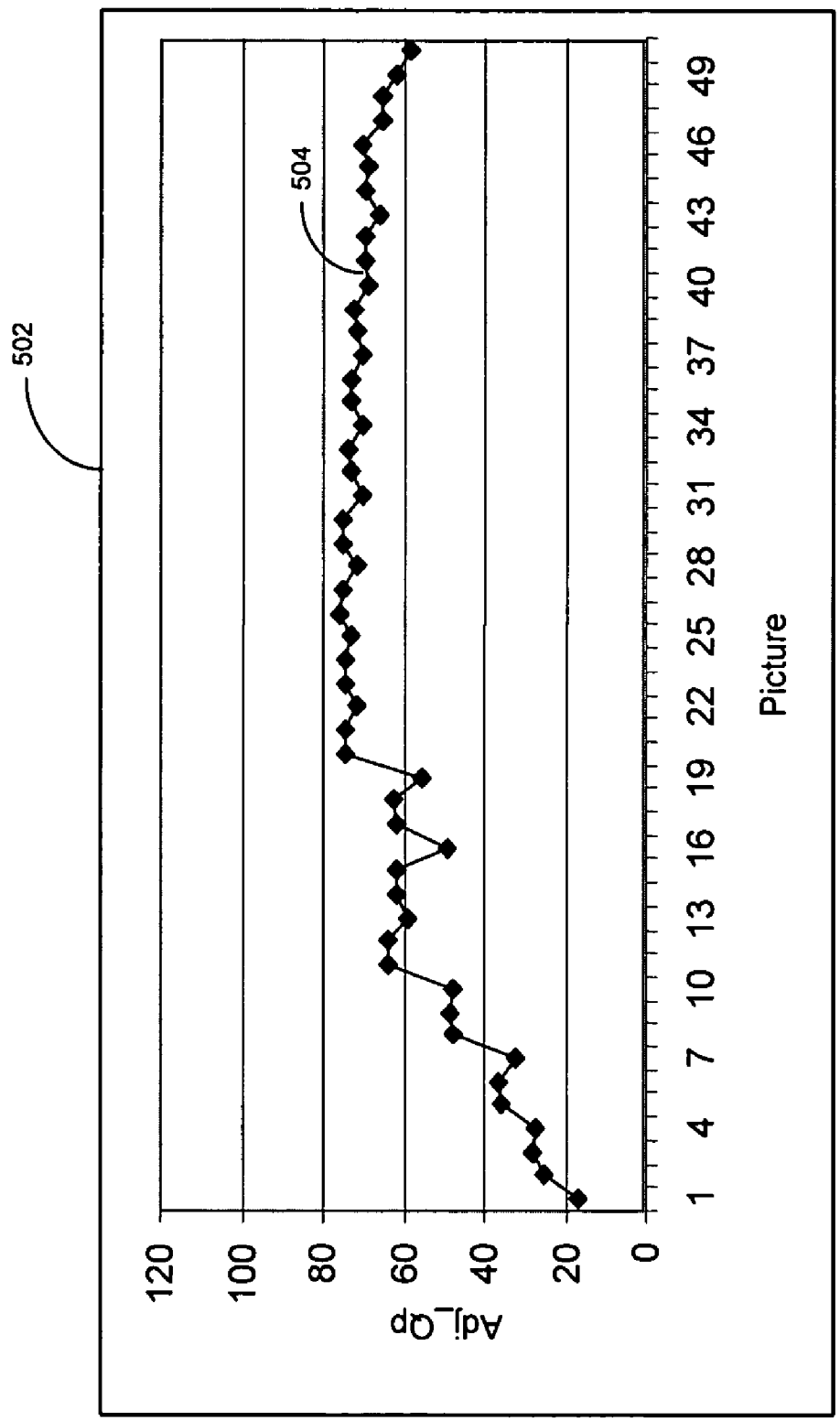
FIG. 5 is a graph illustrating a variable envelope waveform of the adjusted Qp for each picture of a MPEG2 sequence, in accordance with an embodiment of the invention.

FIG. 5 is a graph 502 illustrating a variable envelope waveform 504 of the adjusted Qp for each picture of a MPEG2 sequence, in accordance with an embodiment of the invention. Comparing the adjusted Qp waveform 504 to the average Qp waveform 304 (FIG. 3) and the PSNR waveform 404 (FIG. 4), the adjusted Qp value may represent the quality of the B pictures more accurately than the average Qp value.

Figure 6:
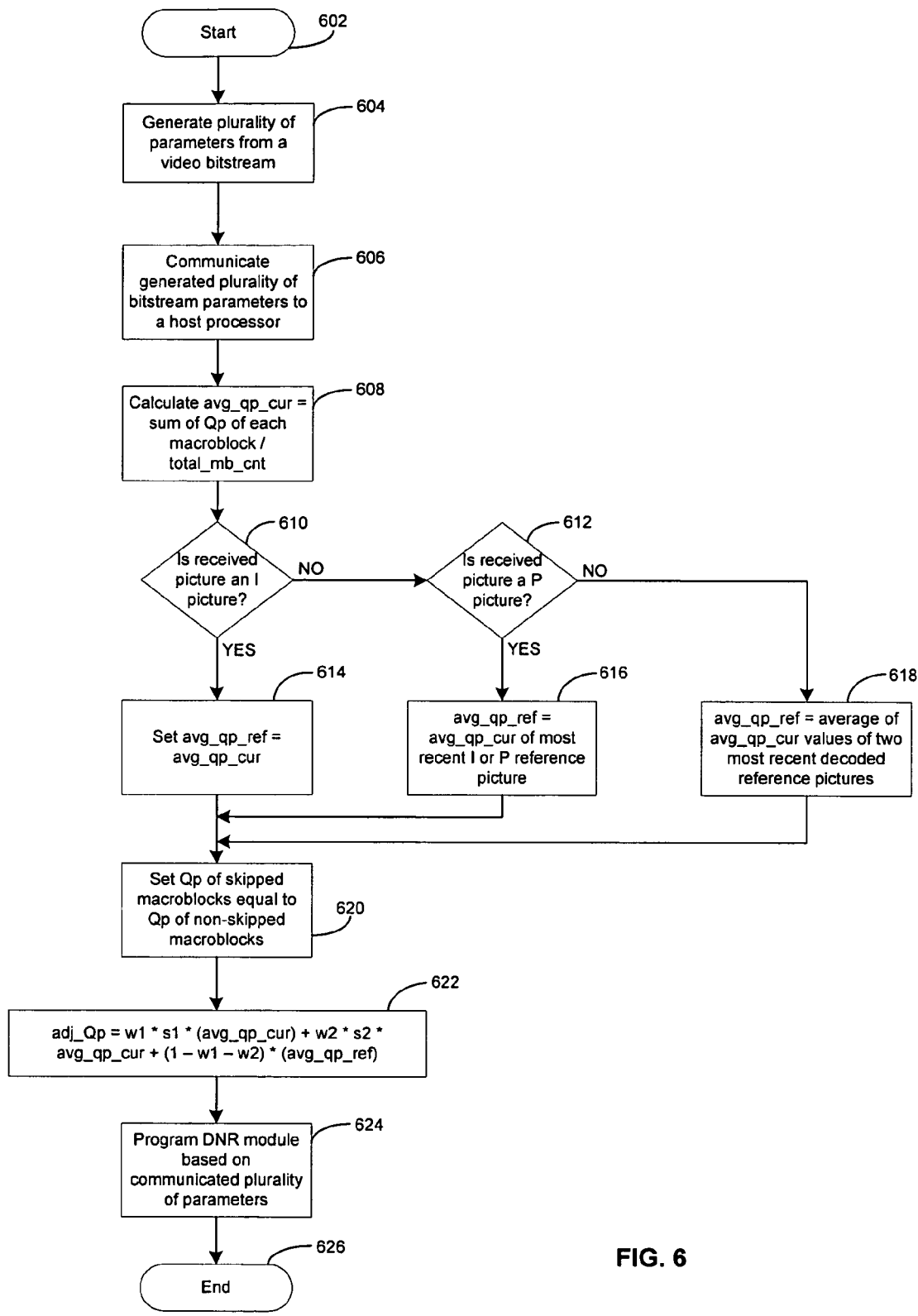
FIG. 6 is a flowchart illustrating detailed steps for parameter generation for digital noise reduction based on bitstream properties.

FIG. 6 is a flowchart illustrating detailed steps for parameter generation for digital noise reduction based on bitstream properties. Referring to FIG. 6, exemplary steps may start at step 602. In step 604, a plurality of picture level parameters may be generated from a video bitstream. In step 606, the generated plurality of picture level parameters may be communicated to a host processor. In step 608, the average quantization parameter of the current picture (avg_qp_cur) may be calculated as:

$$\text{avg\_qp\_cur} = \text{sum of } Qp \text{ of each macroblock/total\_mb\_cnt}$$

where Qp is a quantization parameter and the parameter total_mb_count is total number of macroblocks. In step 610, it may be determined whether the received picture is an I picture. If the received picture is an I picture, control passes to step 614, where the average quantization parameter of the reference picture (avg_qp_ref), for the intra (I) picture is set to be equal to the average quantization parameter of the current picture (avg_qp_cur). Control then passes to step 620. If the received picture is not an I picture, control passes to step 616.

In step 616, it may be determined whether the received picture is a P picture. If the received picture is a P picture, control passes to step 616, where the average quantization parameter of the reference picture (avg_qp_ref) is equal to the average quantization parameter of the current picture (avg_qp_cur) of most recent reference I/P pictures. Control then passes to step 620. If the received picture is not a P picture, control passes to step 618. In step 618, the average quantization parameter of the reference picture (avg_qp_ref, for a bidirectional (B) picture is equal to an arithmetic average of the average quantization parameter of the current picture (avg_qp_cur) values for two most recently decoded reference pictures. Control then passes to step 620.

In step 620, the quantization parameter (Qp) of skipped macroblocks may be set to be equal to a quantization parameter of non-skipped macroblocks. In step 622, an adjusted average quantization parameter (adj_Qp) for a picture may be calculated as:

$$adj\_Qp = w1*s1*(avg\_qp\_cur) + w2*s2*avg\_qp\_cur + (1-w1*s1-w2*s2)*(avg\_qp\_ref)$$

where avg_qp_ref is the average quantization parameter of the reference picture, avg_qp_cur is the average quantization parameter of the current picture. In addition, $$w1 = (intra\_mb\_cnt/total\_mb\_cnt), w2 = (inter\_coded\_mb\_cnt/total\_mb\_cnt)$$

$$s1 = (intra\_low\_sum + intra\_hi\_sum)/2114$$

$$s2 = (inter\_low\_sum + inter\_hi\_sum)/1024$$

where intra_mb_cnt is the total number of macroblocks, inter_coded_mb_cnt is the total number of inter macroblocks, total_mb_cnt is the total number of macroblocks, inter_low_sum is the sum of the low order, for example, first 36 matrix elements, in zig-zag scan order, of the intra quantization matrix, intra_hi_sum is the sum of the high order, for example, last 28 matrix elements, in zig-zag scan order, of the intra quantization matrix, inter_low_sum is the sum of the low order, for example, first 36 matrix elements, in zig-zag scan order, of the inter quantization matrix and inter_hi_sum is the sum of the high order, for example, last 28 matrix elements, in zig-zag scan order, of the inter quantization matrix. In step 624, a digital noise reduction module may be programmed based on the communicated generated plurality of picture level parameters. Control may end at step 626.

In another embodiment of the invention, a system for parameter generation for digital noise reduction may comprise a host processor that receives a plurality of picture level parameters generated by a video decoder for a video stream. The host processor may control a digital noise reduction (DNR) module that processes input video from a video bus using the received plurality of picture level parameters.

A video decoder may generate a plurality of picture level parameters from a video bitstream. The video decoder may comprise suitable logic, circuitry and/or code that may be adapted to communicate the generated plurality of picture level parameters to a host processor. The host processor may comprise suitable logic, circuitry and/or code that may be adapted to program a digital noise reduction module based on the communicated generated plurality of picture level parameters.

The generated plurality of picture level parameters may comprise at least one of: a reference picture flag (ref_pic_flag), an average quantization parameter of a current picture (avg_qp_cur), an average quantization parameter of a reference picture (avg_qp_ref), total number of intra macroblocks (intra_mb_cnt), total number of inter macroblocks (inter_coded_mb_cnt), total number of macroblocks (total_mb_cnt), sum of low order, for example, first 36 matrix elements, in zig-zag scan order, of an intra quantization matrix (intra_l_ow_sum), sum of high order, for example, last 28 matrix elements, in zig-zag scan order, of the intra quantization matrix (intra_hi_sum), sum of low order, for example, first 36 matrix elements, in zig-zag scan order, of an inter quantization matrix (inter_low_sum) and sum of high order, for example, last 28 matrix elements, in zig-zag scan order, of the inter quantization matrix (inter_hi_sum) for the video bitstream.

The host processor may comprise suitable logic, circuitry and/or code that may be adapted to calculate the average quantization parameter of the current picture as a ratio of a sum of quantization parameters of each macroblock to the total number of macroblocks. The quantization parameter (Qp) of skipped macroblocks may be set to be equal to a quantization parameter of non-skipped macroblocks.

The average quantization parameter of the reference picture (avg_qp_ref, for an intra (I) picture may be set to be equal to the average quantization parameter of the current picture (avg_qp_cur). The average quantization parameter of the reference picture (avg_qp_ref), for a predicted (P) picture may be equal to at least one of: the average quantization parameter of the current picture (avg_qp_cur) of most recent reference P picture and the average quantization parameter of the current picture (avg_qp_cur) of most recent reference intra (I) picture. The average quantization parameter of the reference picture (avg_qp_ref), for a bidirectional (B) picture may be equal to an arithmetic average of the average quantization parameter of the current picture (avg_qp_cur) values for two most recently decoded reference pictures.

The host processor may comprise suitable logic, circuitry and/or code that may be adapted to calculate an adjusted average quantization parameter as a weighted sum of the average quantization parameter of the current picture and the average quantization parameter of the reference picture. The weighted sum may be a function of ratio of the total number of intra macroblocks to the total number of macroblocks. The weighted sum may be a function of ratio of the total number of inter macroblocks to the total number of macroblocks. The weighted sum may be a function of the sum of the low order matrix elements. The weighted sum may be a function of the sum of the high order matrix elements.

The host processor may be adapted to receive user controlled data to control the digital noise reduction (DNR) module. The digital noise reduction module (DNR) may comprise suitable logic, circuitry and/or code that may be adapted to reduce mosquito artifacts and/or blocking artifacts based on at least a portion of the generated plurality of picture level parameters.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for image processing, the method comprising:
receiving at a host processor, a plurality of picture level parameters generated by a video decoder, wherein said plurality of picture level parameters comprises an average quantization parameter of a current picture and an average quantization parameter of a reference picture;
calculating an adjusted average quantization parameter as a weighted sum of said average quantization parameter of said current picture and said average quantization parameter of said reference picture; and
controlling by said host processor, a digital noise reduction (DNR) module that processes input video based on said calculated adjusted average quantization parameter.

2. The method according to claim 1, wherein said plurality of picture level parameters comprises one or more of: a reference picture flag, total number of intra macroblocks, total number of inter macroblocks, total number of macroblocks, a sum of low order matrix elements of an intra quantization matrix in zig-zag scan order, a sum of high order matrix elements of said intra quantization matrix in zig-zag scan order, a sum of low order matrix elements of an inter quantization matrix in zig-zag scan order, and/or a sum of high order matrix elements of said inter quantization matrix in zig-zag scan order.

3. The method according to claim 2, comprising calculating said average quantization parameter of said current picture as a ratio of a sum of quantization parameters of each said macroblock to said total number of said macroblocks.

4. The method according to claim 3, comprising setting said quantization parameter of skipped macroblocks equal to a quantization parameter of non-skipped macroblocks.

5. The method according to claim 3, wherein said average quantization parameter of said reference picture, for an intra (I) picture is set equal to said average quantization parameter of said current picture.

6. The method according to claim 3, wherein said average quantization parameter is:
if said reference picture is a predicted (P) picture, equal to one or both of: said average quantization parameter of said current picture of most recent reference P picture and/or said average quantization parameter of said current picture of most recent reference intra (I) picture; and
if said reference picture is a bidirectional (B) picture, equal to an arithmetic average of said average quantization parameter of said current picture values for two most recently decoded reference pictures.

7. The method according to claim 3, wherein said weighted sum is one or more of: a function of ratio of said total number of said intra macroblocks to said total number of said macroblocks, a function of ratio of said total number of said inter macroblocks to said total number of said macroblocks, a function of said sum of said low order matrix elements, and/or a function of said sum of said high order matrix elements.

8. The method according to claim 1, comprising controlling said digital noise reduction (DNR) module by said host processor via received user controlled information and at least a portion of said received plurality of picture level parameters.

9. The method according to claim 1, comprising reducing one or both of: mosquito noise artifacts and/or block noise artifacts based on at least a portion of said generated plurality of picture level parameters.

10. A machine-readable storage having stored thereon, a computer program having at least one code section for image processing, the at least one code section being executable by a machine for causing the machine to perform steps comprising:
receiving at a host processor, a plurality of picture level parameters generated by a video decoder, wherein said plurality of picture level parameters comprises an average quantization parameter of a current picture and an average quantization parameter of a reference picture;
calculating an adjusted average quantization parameter as a weighted sum of said average quantization parameter of said current picture and said average quantization parameter of said reference picture; and
controlling by said host processor, a digital noise reduction (DNR) module that processes input video based on said calculated adjusted average quantization parameter.

11. The machine-readable storage according to claim 10, wherein said plurality of picture level parameters comprises one or more of: a reference picture flag, total number of intra macroblocks, total number of inter macroblocks, total number of macroblocks, a sum of low order matrix elements of an intra quantization matrix in zig-zag scan order, a sum of high order matrix elements of said intra quantization matrix in zig-zag scan order, a sum of low order matrix elements of an inter quantization matrix in zig-zag scan order, and/or a sum of high order matrix elements of said inter quantization matrix in zig-zag scan order.

12. The machine-readable storage according to claim 11, wherein said at least one code section comprises code for calculating said average quantization parameter of said current picture as a ratio of a sum of quantization parameters of each said macroblock to said total number of said macroblocks.

13. The machine-readable storage according to claim 12, wherein said at least one code section comprises code for setting said quantization parameter of skipped macroblocks equal to a quantization parameter of non-skipped macroblocks.

14. The machine-readable storage according to claim 12, wherein said average quantization parameter of said reference picture, for an intra (I) picture is set equal to said average quantization parameter of said current picture.

15. The machine-readable storage according to claim 12, wherein said average quantization parameter is:
- if said reference picture is a predicted (P) picture, equal to one or both of: said average quantization parameter of said current picture of most recent reference P picture and/or said average quantization parameter of said current picture of most recent reference intra (I) picture; and
- if said reference picture is a bidirectional (B) picture, equal to an arithmetic average of said average quantization parameter of said current picture values for two most recently decoded reference pictures.

16. The machine-readable storage according to claim 12, wherein said weighted sum is one or more of: a function of ratio of said total number of said intra macroblocks to said total number of said macroblocks, a function of ratio of said total number of said inter macroblocks to said total number of said macroblocks, a function of said sum of said low order matrix elements, and/or a function of said sum of said high order matrix elements.

17. The machine-readable storage according to claim 10, wherein said at least one code section comprises code for controlling said digital noise reduction (DNR) module by said host processor via received user controlled information and at least a portion of said received plurality of picture level parameters.

18. The machine-readable storage according to claim 10, wherein said at least one code section comprises code for reducing one or both of: mosquito noise artifacts and/or block noise artifacts based on at least a portion of said generated plurality of picture level parameters.

19. A system for image processing, the system comprising:
- one or more processors that are operable to receive a plurality of picture level parameters generated by a video decoder, wherein said plurality of picture level parameters comprises an average quantization parameter of a current picture and an average quantization parameter of a reference picture;
- said one or more processors are operable to calculate an adjusted average quantization parameter as a weighted sum of said average quantization parameter of said current picture and said average quantization parameter of said reference picture; and
- said one or more processors are operable to control a digital noise reduction (DNR) module that processes input video based on said calculated adjusted average quantization parameter.

20. The system according to claim 19, wherein said plurality of picture level parameters comprises one or more of: a reference picture flag, total number of intra macroblocks, total number of inter macroblocks, total number of macroblocks, a sum of low order matrix elements of an intra quantization matrix in zig-zag scan order, a sum of high order matrix elements of said intra quantization matrix in zig-zag scan order, a sum of low order matrix elements of an inter quantization matrix in zig-zag scan order, and/or a sum of high order matrix elements of said inter quantization matrix in zig-zag scan order.

21. The system according to claim 20, wherein said one or more processors are operable to calculate said average quantization parameter of said current picture as a ratio of a sum of quantization parameters of each said macroblock to said total number of said macroblocks.

22. The system according to claim 21, wherein said one or more processors are operable to set said quantization parameter of skipped macroblocks equal to a quantization parameter of non-skipped macroblocks.

23. The system according to claim 21, wherein said one or more processors are operable to set said average quantization parameter of said reference picture for an intra (I) picture to be equal to said average quantization parameter of said current picture.

24. The system according to claim 21, wherein said average quantization parameter is:
- if said reference picture is a predicted (P) picture, equal to one or both of: said average quantization parameter of said current picture of most recent reference P picture and/or said average quantization parameter of said current picture of most recent reference intra (I) picture; and
- if said reference picture is a bidirectional (B) picture, equal to an arithmetic average of said average quantization parameter of said current picture values for two most recently decoded reference pictures.

25. The system according to claim 21, wherein said weighted sum is one or more of: a function of ratio of said total number of said intra macroblocks to said total number of said macroblocks, a function of ratio of said total number of said inter macroblocks to said total number of said macroblocks, a function of said sum of said low order matrix elements, and/or a function of said sum of said high order matrix elements.

26. The system according to claim 19, wherein said one or more processors are operable to control said digital noise reduction (DNR) module via received user controlled information and at least a portion of said received plurality of picture level parameters.

27. The system according to claim 19, wherein said digital noise reduction module (DNR) reduces one or both of: mosquito noise artifacts and/or block noise artifacts based on at least a portion of said generated plurality of picture level parameters.

* * * * *